United States Patent [19]

Kloster

[11] 4,285,132
[45] Aug. 25, 1981

[54] PISTON ROD RUNOUT GAUGE

[76] Inventor: Kenneth D. Kloster, 6649 Millridge, Maumee, Ohio 43537

[21] Appl. No.: 86,788

[22] Filed: Oct. 22, 1979

[51] Int. Cl.³ .......................... G01B 3/22; G01B 5/24
[52] U.S. Cl. ................................. 33/172 R; 33/174 Q
[58] Field of Search ........... 33/172 R, 174 Q, 174 M, 33/178 D, 180 AT, 181 AT, 412

[56] References Cited

U.S. PATENT DOCUMENTS

| 2,545,784 | 3/1951 | Kenner | 33/180 AT |
| 2,726,058 | 12/1955 | Foltz | 33/412 |
| 3,465,449 | 9/1969 | Widenburg et al. | 33/172 R |
| 4,064,633 | 12/1977 | Wertepny | 33/178 D |

FOREIGN PATENT DOCUMENTS

| 2603620 | 8/1976 | Fed. Rep. of Germany | 33/172 R |
| 898558 | 4/1945 | France | 33/172 R |
| 595320 | 12/1947 | United Kingdom | 33/172 R |
| 141633 | 9/1960 | U.S.S.R. | 33/181 AT |

Primary Examiner—Richard R. Stearns
Attorney, Agent, or Firm—Wilson, Fraser, Barker & Clemens

[57] ABSTRACT

An instrument to measure the concentricity of a piston rod relative to its cylinder, has an elongate cylindrical support on which are slidably mounted a pair of brackets provided with V-shaped notches embracingly to engage the cylinder and hold the support in parallel relation to the cylinder. At the outer end of the support and disposed at right angles thereto is a feeler probe to engage the piston rod. A calibrated dial, having an associated pointer, is carried by the support and the pointer is articulated to the feeler probe for causing the pointer to indicate in the dial the degree of concentricity of the piston rod.

4 Claims, 3 Drawing Figures

PISTON ROD RUNOUT GAUGE

BACKGROUND OF THE INVENTION

Shock absorbers for automobiles usually include a dashpot in which a piston reciprocates within a fluid containing cylinder, the piston rod projecting from the cylinder through a guide aperture in the end wall for attachment to a vehicle part. Due to accidents, such as collisions, the piston rod not infrequently becomes bent, thereby destroying the necessary concentricity between the piston rod and cylinder. Such eccentricity of the piston rod may be slight and virtually impossible to determine by the naked eye, but even though it is slight, the action of the shock absorber is impaired and its effectiveness diminished if not permanently damaged. Thus, it has been extremely difficult for a service man to ascertain the efficient operability of the shock absorber.

SUMMARY OF THE INVENTION

A simple and efficient instrument for determining the concentricity of a piston rod with respect to its cylinder is produced. Thus, it is a gauge which can measure the concentricity of the piston rod relative to its cylinder throughout the length of the rod. This can be achieved almost instantly so that as the rod is run in or out of its cylinder, concentricity at various places in its length can be ascertained. The gauge has an elongate body adapted through supports to bear against the cylinder so that the body and cylinder are parallel. At the outer end portion of the elongate body is a feeler, which is spring urged against the piston rod. The feeler is suitably converted to an indicator, which has a pointer to indicate the degree of eccentricity of the piston rod relative to the cylinder as the rod is shifted longitudinally or axially.

BRIEF DESCRIPTION OF THE DRAWINGS

An embodiment of the invention is shown in the accompanying drawings, in which.

DETAIL DESCRIPTION OF THE PREFERRED EMBODIMENT

Figure 1:
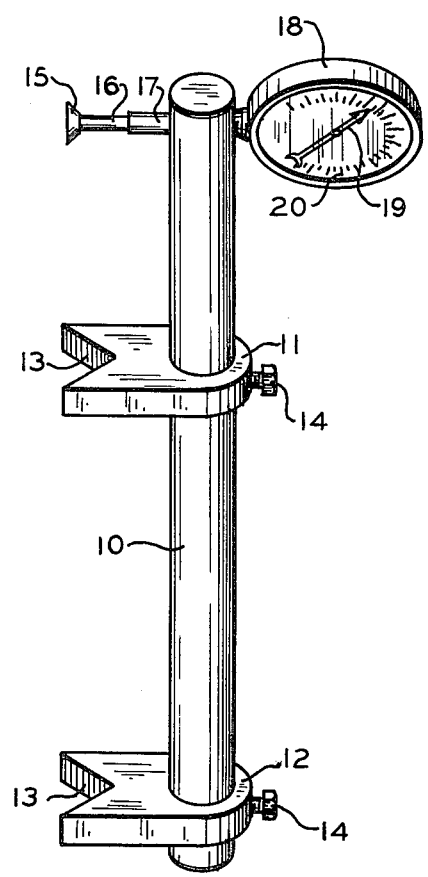
FIG. 1 is a perspective view of the piston rod runout gauge.

The illustrated embodiment of the invention comprises a piston rod runout gauge for application to a piston rod and cylinder assembly for determining the concentricity of the rod with respect to the cylinder, in which there is provided an elongate shaft or helve 10 of cylindrical form. Other forms, such as oval or polygonal may be used to advantage. The length of the shaft is chosen to accomodate a pair of suitably spaced laterally extending brackets or supports 11 and 12 of similar form and each having at its outer end a V-shaped notch 13 of a size to engage straddlewise the walls of a cylinder, as will hereinafter appear. Each support is apertured at its inner end portion slidably to fit the shaft 10. It will be apparent that the supports 11 and 12 are parallel to each other and they may be adjusted toward and away from each other as desired. For this purpose an elongate groove 14a is formed in the shaft 10 and extends a substantial portion of its length. Each of the supports has a set screw 14, which extends into the groove 14a and, when tightened, retains the respective support in position of adjustment.

The adjusted positions of the supports 11 and 12 are important with respect to a spring tensioned feeler probe 15 at the outer end of the shaft 10 and in parallel relation to the plate supports 11 and 12. The feeler probe 15 is placed in engagement with the piston rod whose concentricity, as to its cylinder, is being determined as will hereinafter appear. The feeler probe 15 is on the outer end of a stem 16 reciprocable within a sleeve 17 fixed to and arranged transversely through the shaft 10. The stem 16 and feeler probe 15 are parts of a gauge provided with a dial 18 and a pointer 19 associated with indicia or calibrations 20. Detailed description and illustration of the gauge is not considered necessary. Suffice it to say that in and out movements of the feeler probe 15 are transmitted to the pointer 19, which indicates on the dial the condition with respect to the piston rod.

Figure 2:
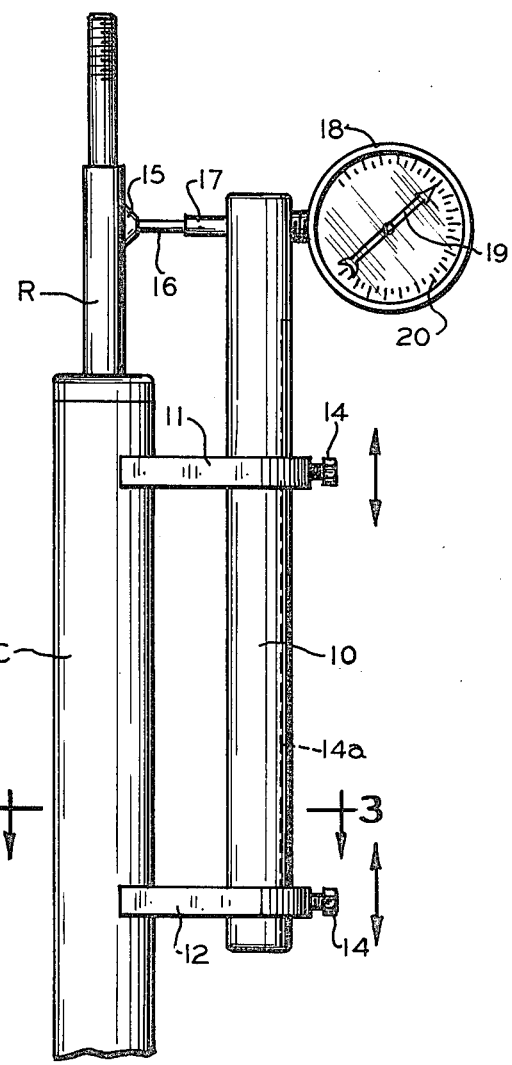
FIG. 2 is a side elevation of the piston rod runout gauge applied in operative position to a cylinder-piston rod assembly.
Figure 3:
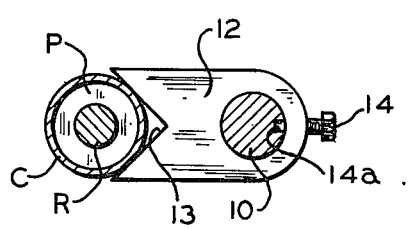
FIG. 3 is a transverse sectional view taken along line 3—3 of FIG. 2.

FIGS. 2 and 3 of the drawing show the instrument in position of use on a cylinder C in which is a piston P having a piston rod R extending outside of the cylinder. The supports 11 and 12 have been positioned on the support shaft 10 so as embracingly to engage spaced portions of the cylinder C and to maintain the shaft 10 parallel to the cylinder. The shaft 10 serves also as a handle for the instrument for applying it to the cylinder and rod. The V-shaped notches 13 are so designed as to fit cylinders of different diameters. In use, the feeler probe 15 is spring urged against the piston rod R and by positioning the instrument at various locations around the cylinder, the concentricity of the rod can be determined on the dial 18 by the pointer 19. Similarly the movement of the piston rod R in and out of the cylinder C to different positions will readily show whether the concentricity of the rod is within acceptable tolerances. This makes possible a speedy determination as to whether the concentricity of the piston rod R with respect to the cylinder C is acceptable to enable efficient operation of the piston and cylinder assembly.

Although description of the structure and operation of a preferred form of gauge has been given, it is to be understood that changes in details of construction and operation and choice of materials may be effected within the purview of the invention.

What I claim is:

1. A piston rod runout gauge for determining the concentricity of the rod with respect to its cylinder comprising:
   a. an elongate support providing a handle for manipulating the gauge, said support having a longitudinal axis;
   b. cylinder engaging means for holding said support in parallel relation to the cylinder, said engaging means including a pair of spaced apart brackets shiftable along said support, said brackets extending generally normal to the longitudinal axis of said support and including V-shaped notches in the outer ends of said brackets for engaging the cylinder;
   c. an actuating device in the end of said support to engage the piston rod, said device spaced from said brackets and including a feeler probe extending normal to the longitudinal axis of said support in parallel relation to said brackets; and d. means responsive to said actuating device to indicate the degree of concentricity of the piston rod relative to its cylinder.

2. A piston rod runout gauge as claimed in claim 1, comprising an elongate groove in said support, said brackets apertured to slide over said support, and set screws engaging in said elongate groove for securing said brackets to said support.

3. A piston rod runout gauge as claimed in claim 1 in which said indicating means comprises a dial and pointer articulated to said probe for visually indicating the action thereof.

4. A piston rod runout gauge as claimed in claim 3 in which said elongate support comprises a cylindrical shaft providing a handle for manipulating the gauge.

* * * * *